US009641606B2

(12) United States Patent
King

(10) Patent No.: US 9,641,606 B2
(45) Date of Patent: May 2, 2017

(54) PEER TO PEER SECURE SYNCHRONIZATION BETWEEN HANDHELD DEVICES

(75) Inventor: Benjamin John King, Dallas, TX (US)

(73) Assignee: BlackBerry Limited, Waterloo, Ontario (CA)

(*) Notice: Subject to any disclaimer, the term of this patent is extended or adjusted under 35 U.S.C. 154(b) by 469 days.

(21) Appl. No.: 12/820,839

(22) Filed: Jun. 22, 2010

(65) Prior Publication Data

US 2011/0314167 A1 Dec. 22, 2011

(51) Int. Cl.
*G06F 15/16* (2006.01)
*H04L 29/08* (2006.01)

(52) U.S. Cl.
CPC ............ *H04L 67/104* (2013.01); *H04L 67/14* (2013.01)

(58) Field of Classification Search
CPC ............................. H04L 67/14; H04L 67/104
USPC .......................................... 709/228; 726/4, 9
See application file for complete search history.

(56) References Cited

U.S. PATENT DOCUMENTS

| 5,008,814 | A | 4/1991 | Mathur |
| 5,991,405 | A | 11/1999 | Mills |
| 6,026,293 | A | 2/2000 | Osborn |
| 6,034,621 | A | 3/2000 | Kaufman |
| 6,141,564 | A | 10/2000 | Bruner et al. |
| 6,707,915 | B1 | 3/2004 | Jobst et al. |
| 6,901,434 | B1 | 5/2005 | Lunsford et al. |
| 7,107,082 | B2 | 9/2006 | Lee |
| 7,155,488 | B1 | 12/2006 | Lunsford et al. |
| 7,444,388 | B1 | 10/2008 | Svendsen |
| 7,489,781 | B2 | 2/2009 | Klassen et al. |
| 7,496,381 | B2 | 2/2009 | Kim |
| 7,565,405 | B2 | 7/2009 | Grosse et al. |
| 7,580,894 | B2 | 8/2009 | Vataja et al. |
| 7,673,020 | B2 | 3/2010 | Rosenbloom et al. |
| 7,680,910 | B2 | 3/2010 | Wallis et al. |
| 7,930,250 | B2 | 4/2011 | Lee et al. |
| 2002/0012433 | A1* | 1/2002 | Haverinen et al. ........... 380/247 |
| 2002/0039911 | A1* | 4/2002 | Mountain et al. ............ 455/558 |
| 2002/0055969 | A1* | 5/2002 | Sato et al. .................... 709/203 |
| 2002/0066792 | A1* | 6/2002 | Guthery et al. .............. 235/492 |

(Continued)

FOREIGN PATENT DOCUMENTS

CN 101127026 A * 2/2008
DE 10147503 A1 4/2003

(Continued)

OTHER PUBLICATIONS

Eurpoean Extended Search Report; EP Application No. 10166933.1; Dec. 22, 2010; 11 pages.

(Continued)

*Primary Examiner* — Kostas Katsikis
(74) *Attorney, Agent, or Firm* — Donna Flores; Fleit Gibbons Gutman Bongini & Bianco P.L.

(57) ABSTRACT

A method implemented in a user equipment (UE) comprising a processor. First information is stored to a removable memory connected to the UE and second information is stored to a non-volatile memory of the UE. The first information may be a unique value and may include additional information. A connection request based at least in part on the first information is received. A connection response based at least in part on the second information and the connection request is sent.

20 Claims, 4 Drawing Sheets

(56) References Cited

U.S. PATENT DOCUMENTS

| | | |
|---|---|---|
| 2004/0029568 A1 | 2/2004 | DeLuca et al. |
| 2004/0098583 A1* | 5/2004 | Weber .................. 713/168 |
| 2004/0147284 A1* | 7/2004 | Laumen et al. .......... 455/558 |
| 2004/0176071 A1* | 9/2004 | Gehrmann et al. ........ 455/411 |
| 2004/0242216 A1 | 12/2004 | Boutsikakis |
| 2005/0033848 A1* | 2/2005 | Croome ............... H04W 4/008 709/227 |
| 2005/0113079 A1 | 5/2005 | Guo |
| 2005/0191990 A1* | 9/2005 | Willey et al. ............ 455/411 |
| 2005/0282584 A1 | 12/2005 | Faisy |
| 2006/0007576 A1* | 1/2006 | Georgis ............... G06F 3/0607 360/69 |
| 2006/0105712 A1* | 5/2006 | Glass et al. ............ 455/41.2 |
| 2006/0129848 A1 | 6/2006 | Paksoy et al. |
| 2006/0189298 A1* | 8/2006 | Marcelli ............... 455/411 |
| 2006/0189348 A1 | 8/2006 | Montulli et al. |
| 2007/0032228 A1* | 2/2007 | Varanda ............... G06F 9/4418 455/418 |
| 2007/0182811 A1 | 8/2007 | Rockefeller et al. |
| 2007/0280480 A1 | 12/2007 | Chong |
| 2008/0171578 A1* | 7/2008 | Tysowski ............... 455/558 |
| 2008/0261561 A1* | 10/2008 | Gehrmann ............. 455/411 |
| 2009/0037207 A1 | 2/2009 | Farah |
| 2009/0055645 A1* | 2/2009 | Park et al. .............. 713/168 |
| 2009/0068988 A1* | 3/2009 | Cofta ................... 455/411 |
| 2009/0300753 A1* | 12/2009 | Lin ..................... G06F 21/34 726/16 |
| 2011/0252151 A1* | 10/2011 | Lu et al. ............... 709/228 |
| 2011/0314170 A1* | 12/2011 | Gisby .................. 709/229 |
| 2012/0052832 A1* | 3/2012 | Bleckert et al. ......... 455/404.1 |

FOREIGN PATENT DOCUMENTS

| | | | |
|---|---|---|---|
| EP | 1947874 A1 | 7/2008 | |
| KR | 20070063727 A * | 6/2007 | |
| WO | WO 9516238 A1 * | 6/1995 | ......... G06F 12/1466 |
| WO | 2006062475 A2 | 6/2006 | |
| WO | 2006110989 A1 | 10/2006 | |
| WO | 2008003911 A2 | 1/2008 | |
| WO | WO 2010056266 A1 * | 5/2010 | ............ A63F 13/12 |
| WO | WO 2010086012 A1 * | 8/2010 | |

OTHER PUBLICATIONS

Eurpoean Extended Search Report; EP Application No. 10166285. 6; Dec. 6, 2010; 7 pages.

European Examination Report; Application No. 10166933.1; Aug. 10, 2011; 7 pages.

Gisby, Douglas Michael; U.S. Appl. No. 12/817,349, filed Jun. 17, 2010; Title: Wireless Device Swap.

Multimediacard Association; JEDEC Solid State Technology Association; Embedded MulitMediaCard(e-MMC)e-MMC/Card Product Standard, High Capacity, including Reliable Write, Boot, Sleep Modes, Dual Data Rate, Multiple Partitions Supports and Security Enhancement (MMCA, 4.4); JEDEC Standard; Mar. 2009; 234 pages; JESD84-A44.

MSDN; "Overview of Collaborative Synchronization," http://msdn.microsoft.com/en-us/library/bb902850(printer).aspx; Microsoft Corporation; 2010; 2 pages.

Office Action dated Dec. 30, 2011; U.S. Appl. No. 12/817,349, filed Jun. 17, 2010; 20 pages.

European Examination Report; Application No. 10166933.1; Jan. 9, 2013; 7 pages.

* cited by examiner

PEER TO PEER SECURE SYNCHRONIZATION BETWEEN HANDHELD DEVICES

BACKGROUND

Users may desire or be required to switch from one user equipment (UE) to another UE such as, for example, from an older mobile device to a newer mobile device. A problem that can arise when switching UEs is how to transfer data and settings from one UE to another UE.

Normally, in order to avoid having to re-input all contact information, user settings, user preferences, and other user-specific data, a user may use a desktop or laptop computer to facilitate a swap operation in which this information is transferred from the older UE to the newer UE. The information may be transferred, at least in part, in the form of an archive file. Software on the computer, sometimes known as a desktop manager, is often used to facilitate this swap operation in which data from the sending UE is stored in an archive file on the computer. The archive file, other data, or both may be transferred to the receiving UE from the computer and subsequently installed, configured, or both installed and configured on the UE.

In many cases, the intermediary computer is desired or is necessary for various reasons, such as for providing intermediate storage due to the amount of data being transferred. However, in some cases, use of an intermediary computer to effect a swap operation may not be desirable or convenient. In other cases, use of an intermediary computer to effect a swap operation may not be possible.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
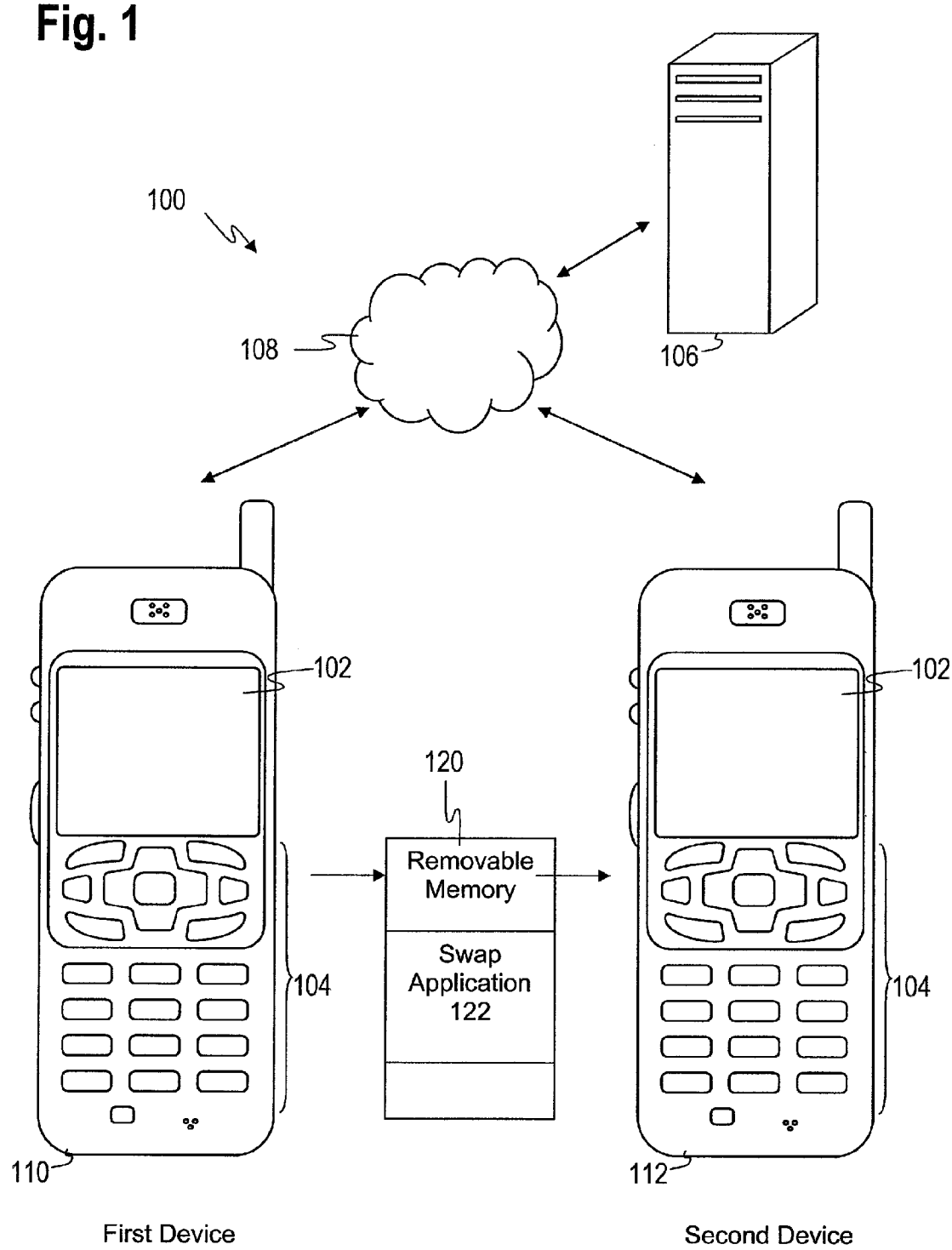
FIG. 1 illustrates a system for switching wireless devices according to an embodiment of the present disclosure.

It should be understood at the outset that although illustrative implementations of one or more embodiments of the present disclosure are provided below, the disclosed systems and methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used herein, the terms "device," "user equipment," and "UE" might in some cases refer to mobile devices such as mobile telephones, personal digital assistants, handheld or laptop computers, email or instant messaging devices, and similar devices that have telecommunications capabilities. Such a UE might consist of a UE and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE might consist of the device itself without such a module. In other cases, the term "UE" might refer to devices that have similar capabilities but that are not transportable, such as desktop computers, set-top boxes, or network appliances. The term "UE" can also refer to any hardware or software component that can terminate a communication session for a user. Also, the terms "user agent," "UA," "user equipment," "UE," "user device" and "user node" might be used synonymously herein.

The present disclosure provides devices and methods for transferring the archive file or other information between the first UE and the second UE without using an intermediary computer or other intermediate storage device. A transfer of a removable memory and wireless transfer of data may be used to effect the transfer of the settings, or other user, system, or other data.

In a non-limiting embodiment, an exemplary method begins by powering on the first UE, such as the older or original device, and selecting a "switch UE" feature. The UE may then write a unique value, shared secret, or other information to both a removable memory of the first UE and a non-removable memory of the first UE. The first UE may then prompt the user to place the removable memory of the first UE into a second, receiving UE. The first UE may remain on when the removable memory is hot-swappable or, alternatively, the first UE may automatically turn off. In any case, the removable memory may be removed from the UE subsequent to storing the unique value or other information. After the removable memory is removed and when the power is on, the first UE may listen for connection requests. After the removable memory is inserted and when the power is on, the second UE may request a connection with the first UE. The request may be based on the shared information. The first UE may turn off automatically. The user physically transfers the removable memory to the second UE. The user then powers on both UEs. The two UEs will then utilize the shared secret to securely communicate, such as wirelessly, to transfer the archive file, to synchronize settings and preferences, or to both transfer and synchronize, without further user involvement.

FIG. 1 is a diagram illustrating a wireless communication system according to an embodiment of the disclosure. The wireless communications system 100 of FIG. 1 includes an embodiment of typical UEs, such as UE 110 and UE 112, that may communicate with each other via wired or wireless connections via a network, such as network 108. The UEs 110 and 112 are operable for implementing aspects of the disclosure, but the disclosure should not be limited to these implementations. Though illustrated as mobile UEs, the UEs 110 and 112 may take various forms including a wireless handset, a pager, a personal digital assistant (PDA), an email or instant messaging device, a portable computer, a tablet computer, a laptop computer, or other computing devices such as general purpose computing devices or special-purpose communications devices.

The UEs 110 and 112 may include displays 102. The UEs 110 and 112 may also include touch-sensitive surfaces, keyboards, or other input keys for input by a user, generally referenced at 104. The keyboards may be full or reduced alphanumeric keyboards such as QWERTY, Dvorak, AZERTY, and sequential types, or traditional numeric keypads with alphabet letters associated with telephone keypads. The input keys may include track wheels, exit or escape keys, trackballs, and other navigational or functional keys, which may be inwardly depressed to provide further input function. The UEs 110 and 112 may present options for the user(s) to select, controls for the user(s) to actuate, or cursors or other indicators for the user(s) to direct. The UEs 110 and 112 may further accept data entry from the user(s), including numbers to dial or various parameter values for configuring the operation of the UEs 110 and 112. The UEs 110 and 112 may further execute one or more software or firmware applications in response to user commands. These applications may configure the UEs 110 and 112 to perform various customized functions in response to user interaction. Additionally, the UEs 110 and 112 may be programmed or configured over-the-air, for example from a wireless base station, a wireless access point, or a peer device.

Via the wireless link and the wired network, UE 110 has access to information on various servers, such as a server 106, which could be representative of multiple servers possibly distributed over multiple physical locations. The server 106 may provide content that may be shown on the displays 102. Alternately, the UEs 110 and 112 may access the network 108 through a peer device acting as an intermediary, in a relay type or hop type of connection, or by any other suitable means. Server 106 may be implemented as different kinds of servers, and may take the form of software. For example, server 106 may represent an enterprise server, internet service, or other software or devices.

UE 112 may be a similar, newer, or older model device relative to UE 110, such as a replacement device. The user may desire to switch devices for other reasons as well, but the terms "new" and "older" may be used to refer to the devices for purposes of simplicity of disclosure only. In an embodiment, both devices may be email or instant messaging devices.

In some embodiments, a user may wish to switch from using the UE 110, such as the older device, to UE 112, which might be the newer device, but may not have access to a desktop manager, direct device-to-device connection, or other means for transferring settings or other information. The embodiments provide a mechanism for switching devices without using a desktop manager or intermediate storage device. The process of switching devices may be referred to as a swap operation or a synchronization process. During the swap operation or synchronization process, data, such as one or more files, may be transferred or made available to or installed on UE 112. Information written to a removable memory may include a unique value, such as a secret shared between the devices, which might be used to authenticate the transfer process and otherwise promote a secure transfer of data between the devices. The secret may include or may be generated via a hashing function that uses location data describing the location of the UE, time data, random data, first UE specific data (e.g., International Mobile Equipment Identity (IMEI)), and so forth. In some embodiments, system control, application, some user data (such as portions of the archive), or combinations thereof may also be written to the removable memory. The data shared between the devices for swap operation, which may be transferred wirelessly or otherwise, may include all or portions of the data archive of the user data to be transferred, system or application data, settings, preferences, stored information, or any other information.

In the embodiment of FIG. 1, UE 110 has a removable memory 120, which in an embodiment is a SIM card. Removable memory 120 may be any type of memory that may be removed and transferred, and is not necessarily limited to a card, and further may take the form of multiple, distinct hardware devices. Removable memory 120 may take the form of a multimedia card (MMC), embedded multimedia card (eMMC), subscriber identity module (SIM), flash card, other memory card, or any other storage device that may be removed from UE 110 and transferred to UE 112. Removable memory 120 may be referred to as a portable memory, in some embodiments. In addition to removable memory 120, either or both of UE 110 or 112 may include additional forms of non-volatile memory that may or may not be easily transferable or readily removable.

In an exemplary embodiment of a synchronization process, the user may turn on the first UE 110, having the installed removable memory, and select a "switch UE" feature on the first UE 110. As discussed above and in greater detail below, a unique value may be stored in the memory of the first UE 110 as well as in the removable memory installed in the first UE 110. The first UE 110 may then switch off automatically. The user places the removable memory into the second UE 112. The user then turns on both UEs 110 and 112. The two UEs, 110 and 112, will then synchronize automatically without further user involvement. The transfer of data during the synchronization process may be effected by wireless communication between UE 110 and UE 112. Examples of wireless communication include but are not limited to Bluetooth® networks, wireless local area networks (WLANs), worldwide interoperability for microwave access (WiMAX) networks, or cellular networks such as Universal Mobile Telecommunications System Terrestrial Radio Access Network (UTRAN) and Long Term Evolution (LTE) networks.

Responsive to the user selecting the "switch UE" feature on the first UE 110, the first UE 110 writes at least one unique value to both the removable memory 120 and a non-volatile memory of the first UE 110. The unique value (s) serves as a shared secret between the first UE 110 and the second UE 112 when the removable memory 120 is moved from the first UE 110 to the second UE 112. Wireless communication between the two UEs may then be established via a server, via a short range or local wireless network between the two UEs, or via an ad-hoc network between the two UEs, or via some other network. The shared secret may then be used to authorize the communication and transfer, provide data synchronization, encrypt the data to be transferred, or otherwise used to promote the transfer of data between the two UEs.

The unique value(s) may be a hash values or hash values based on either of the first UE's password or second UE's password, a combination of the first and second UE's passwords, the first and second UE's International Mobile Equipment Identity (IMEI) number, a random number, position information of the first UE, time information such as a timestamp showing the time of a request, the time the has value is stored, time of transfer, or other time information, or other information. The second UE might know the first UE's IMEI as a result of storing the first UE's IMEI to the removable memory, transferring the removable memory to the second UE, and then loading the first UE's IMEI into the second UE's memory. Additionally, the hash value(s) may be used as cryptographic keys to encrypt any of the data being sent back and forth between the first and second UEs 110 and 112. In addition, various combinations of techniques for securing communications may be used.

As an example of an optional security measure, the position information of the first UE 110 may be stored, such as associated with the unique value. The first UE 110 can then decrypt this information, as an additional measure of security, and determine if its current position and time are similar enough to the decrypted position and time, so as to allow the switching process to continue.

As another example, time information associated with the unique value might be stored, which for example might store the time when the unique value is written in the removable memory. The stored time information may be compared to a time at which the swap operation is eventually initiated. If too much time has passed, then the swap operation might not be permitted.

Optionally, when the user turns on the second UE 112, the user may select a "start UE switch" feature on the second UE 112 to start the synchronization process on the second UE 112. Also optionally, as a security measure, the user may be required to enter the first UE's 110 password into the first UE 110 after the first UE 110 is turned on. If the password is not correct, then the synchronization process may be stopped.

Additionally, the functions of the "UE switch" feature may be performed automatically every time the first UE 110 is turned off and on, so that whenever a user turns off the first UE 110, the first UE 110 automatically writes the unique values to the removable memory 120 and to the first UE's 110 additional non-volatile memory. In this manner, the UE 110 may be prepared automatically to perform the switch UE function whenever powered on.

Additionally, the steps of selecting the "UE switch" feature and turning off the first UE 110 may be combined so that when a user turns off the first UE 110, the first UE 110 automatically writes the unique values to the removable memory 120 and to the memory of the first UE 110 and automatically sets the "switch UE" flag. When the user powers on the first UE 110 without the removable memory 120, and with the "switch UE" flag set, the first UE 110 might attempt to establish a wireless communication with the second UE 112 and then effect transfer of the archive file to the second UE 112. In this manner, users who frequently switch UEs may do so more quickly and conveniently.

In an embodiment, the swap operation or synchronization process may be performed over a 3GPP network. As an example, when the first UE 110 is turned on, it may set itself up as a mobile base station that only accepts connections based on the unique hash values. When the user turns on the second UE 112 with the removable memory 120, the second UE 112 finds the unique values on the removable memory 120 and uses the unique values to join the network with which the first UE 110 can communicate, and to perform the synchronization process. This process may also be performed over a Bluetooth® network or a WLAN network.

As an additional security feature, a user may want to ensure that the switching process only happens when the first and second UEs, 110 and 112, are near each other. The first UE 110 may be programmed to monitor network properties, such as but not limited to signal strength, connection speed, round trip time, and so forth. When one or more of the network properties fall within a certain range or threshold, the first UE 110 may allow the switching or synchronization process, but otherwise prohibit the switch or transfer. As an example, the round trip time of a packet of data over a Wi-Fi® network may be indicative of how physically closely located the first and second UEs are. If the round trip time is too long, according to a predetermined time, then a determination may be made that the first and second UEs are too far apart to ensure adequate security for the process. Similarly, for short-range communications, the network latency can indicate the distance between the two UEs. If the indicated or determined distance is above a certain threshold, then the synchronization process may be disabled. This feature may be used to prevent unintentional or unauthorized switching or synchronization by other devices.

Removable memory 120 may also store an application, such as swap application 122. Swap application 122 may be used to effect all or part of the synchronization process. As shown in FIG. 1, swap application 122 may be stored in the removable memory 120. However, swap application 122 may be stored in some other memory of UE 110, including a memory that is not easily transferable to UE 112. Swap application 122 may be transiently stored on removable memory 120, may be downloaded from server 106, may be part of the operating system of UE 110, may be in whole or in part already on the receiving device, such as UE 112, may be stored partially or completely on any of server 106, UE 110, UE 112, or combinations thereof. Authentication using the time information and proximity or location information above might be useful in instances where the data might be transferred between the devices via the network 108 or server 106 or both.

Swap application 122 may be the software, hardware, or software and hardware combination that controls or enables the "switch UE" feature, and may further control prompting of the user to turn off the first UE 110 and the actual transfer of the archive file from UE 110 to UE 112. Swap application 122 may be multiple software programs that operate independently but communication with each other, such as in the case of a program in receiving UE 112 that controls or effects receipt of the archive file. The swap application 122 may ensure that the archive and other transferred data are properly installed to UE 112. The UE 112 may install, configure, store, or otherwise manage the newly transferred data, possibly according to instructions provided by the swap application 122.

Figure 2:
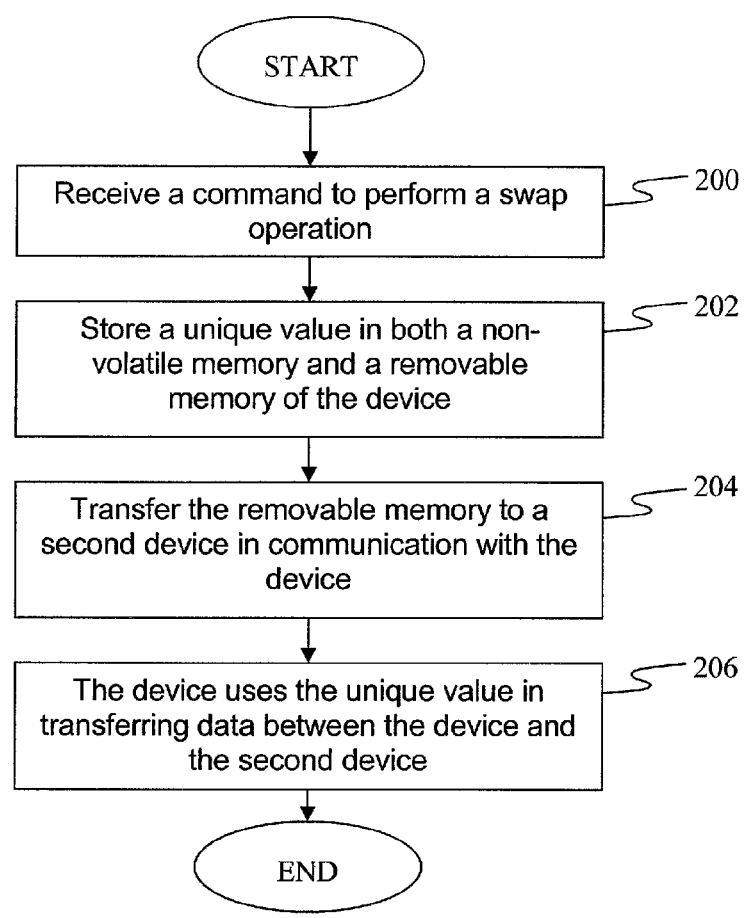
FIG. 2 illustrates a flowchart of a method for switching wireless devices, according to an embodiment of the present disclosure.

FIG. 2 illustrates a flowchart of a method for switching wireless devices, according to an embodiment of the present disclosure. The method shown in FIG. 2 may be implemented in a device, such as but not limited to UEs 110, 112, or both in FIG. 1 or system 415 shown in FIG. 4.

The process begins when the device receives a command to perform a swap operation (block 200). In response, the device stores a unique value in both a non-volatile memory and a removable memory of the device (block 202). The removable memory is transferred to a second device in communication with the device (block 204). When the removable memory is transferred, the device uses the unique value in transferring data between the UE and the second UE (block 206). The process terminates thereafter.

Figure 3:
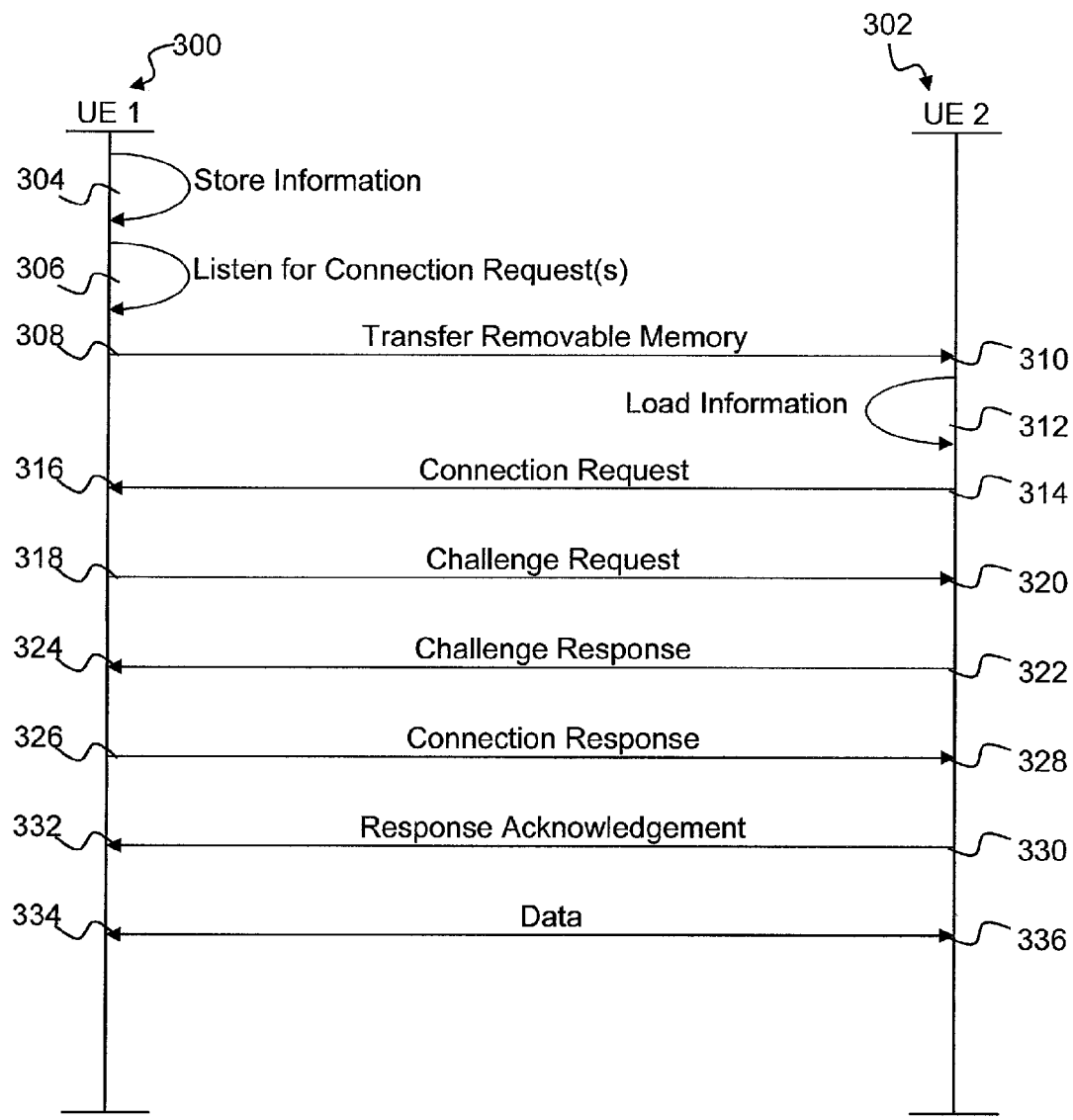
FIG. 3 illustrates a flowchart of a method for switching wireless devices, according to an embodiment of the present disclosure.

FIG. 3 illustrates a flowchart of a method for switching wireless devices, according to an embodiment of the present disclosure. The method shown in FIG. 3 may be implemented in a device, such as but not limited to UEs 110, 112, or both in FIG. 1 or system 415 shown in FIG. 4. In the embodiment shown in FIG. 3, UE 1 300 may be the "old" UE and UE 2 302 may be the "new" UE.

The process begins as UE 1 300 stores information to both a removable memory and a non-volatile memory (process 304). Next, UE 1 300 listens for connection request(s) (process 306). The connection may be via any of a variety of types of data connections or networks, such as but not limited to a Wi-Fi network via a wireless access point (WAP), a Bluetooth® network, a universal serial bus (USB) connection, a peer to peer network, or a non-peer to peer network. The removable memory may be removed from UE 1 300 (process 308) and placed into UE 2 302 (process 310).

UE 2 302 loads the information that had been stored to the removable memory (process 312). UE 2 302 then uses that information to start a connection with UE 1 300.

To start the connection, UE 2 302 transmits a connection request (process 314). UE 1 300 receives the connection request (process 316). In turn, UE 1 300 verifies, authorizes, or otherwise manages the connection request.

Optionally, UE 1 300 may transmit a challenge request (process 318). For example, UE 2 302 may ask for a password or test packet round trip time. If the challenge request is sent, UE 2 302 receives the challenge request (process 320) and then UE 2 302 transmits a challenge response (process 322). In turn, UE 1 300 receives the challenge response (process 324) and may then verify the challenge.

Regardless of whether processes 318 through 324 were performed in that order or with each of those steps, UE 1 300 sends a connection response (process 326) and UE 2 302 receives the connection response (process 328). The connection response indicates whether the connection request was accepted or denied.

When the connection is accepted, UE 2 302 sends a response acknowledgement (process 330) and UE 1 300 receives the response acknowledgement (process 332). The response acknowledgement confirms that UE 2 302 is ready to utilize the connection that has been established. UE 1 300 and UE 2 302 then begin to transfer data (processes 334 and 336) using the connection.

Figure 4:
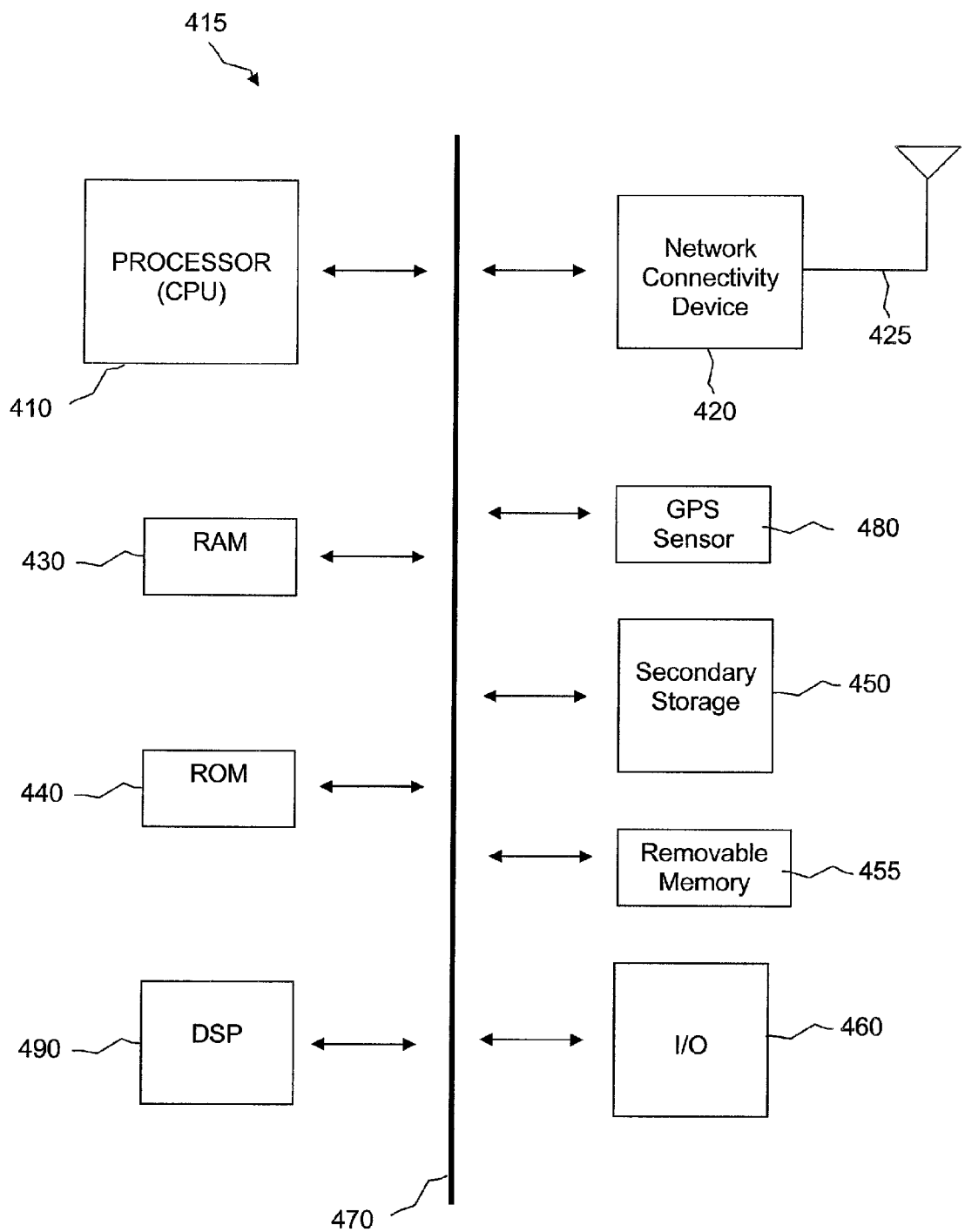
FIG. 4 is a diagram illustrating a system suitable for implementing an embodiment of the present disclosure.

The first and second UEs, such as UEs 110 and 112, as well as other components described above, might include a processing component that is capable of executing instructions related to the actions described above. FIG. 4 illustrates an example of a system 415 that includes a processing component 410 suitable for implementing one or more embodiments disclosed herein. In addition to the processing component 410 (which may be referred to as a central processor unit or CPU), the system 415 might include network connectivity devices 420, random access memory (RAM) 430, read only memory (ROM) 440, secondary storage 450, removable memory 455, and input/output (I/O) devices 470. Removable memory 455 might, in different embodiments, take the form of other devices, such as those described above. RAM 430, ROM 440, and secondary storage 450 may be non-limiting examples of non-volatile memory. These components might communicate with one another via a bus 470. In some cases, some of these components may not be present or may be combined in various combinations with one another or with other components not shown. These components might be located in a single physical entity or in more than one physical entity. Any actions described herein as being taken by the processing component 410 might be taken by the processing component 410 alone or by the processing component 410 in conjunction with one or more components shown or not shown in the drawing, such as a digital signal processor (DSP) 490. Although the DSP 490 is shown as a separate component, the DSP 490 might be incorporated into the processing component 410. Another device that might be part of system 415 is a global positioning satellite (GPS) system 480. GPS system 480 may be used to determine a physical location of system 415.

The processing component 410 executes instructions, codes, computer programs, or scripts that it might access from the network connectivity devices 420, RAM 430, ROM 440, or secondary storage 450 (which might include various disk-based systems such as hard disk, floppy disk, SIM (subscriber identity module) card, or optical disk, or other storage device). An application or other computer usable program code may be stored on any of these devices, or on removable memory 455. While only one CPU 410 is shown, multiple processors may be present. Thus, while instructions may be discussed as being executed by a processor, the instructions may be executed simultaneously, serially, or otherwise by one or multiple processors. The processing component 410 may be implemented as one or more CPU chips.

The network connectivity devices 420 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, or other well-known devices for connecting to networks. These network connectivity devices 420 may enable the processing component 410 to communicate with the Internet or one or more telecommunications networks or other networks from which the processing component 410 might receive information or to which the processing component 410 might output information. The network connectivity devices 420 might also include one or more transceiver components 425 capable of transmitting or receiving data wirelessly.

The RAM 430 might be used to store volatile data and perhaps to store instructions that are executed by the processing component 410. The ROM 440 is a non-volatile memory device that typically has a smaller memory capacity than the memory capacity of the secondary storage 450. ROM 440 might be used to store instructions and perhaps data that are read during execution of the instructions. Access to both RAM 430 and ROM 440 is typically faster than to secondary storage 450. The secondary storage 450 is typically comprised of one or more disk drives or tape drives and might be used for non-volatile storage of data or as an over-flow data storage device if RAM 430 is not large enough to hold all working data. Secondary storage 450 or eMMC 455 may be used to store programs that are loaded into RAM 430 when such programs are selected for execution.

The I/O devices 460 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 425 might be considered to be a component of the I/O devices 460 instead of or in addition to being a component of the network connectivity devices 420.

Thus, the embodiments provide for a user equipment (UE) including a non-volatile memory, a removable memory, and a processor. The processor is configured, responsive to receiving a command to perform a swap operation, to store a unique value in the non-volatile memory and the removable memory, such that when the removable memory is transferred to a second UE in communication with the UE, the UE uses the unique value in transferring data between the UE and the second UE. The embodiments also provide for a method and a computer readable storage medium or non-transitory storage medium for implementing a process for accomplishing the above.

The embodiments also provide for a method implemented in a user equipment (UE) comprising a processor. First information is stored to a removable memory connected to the UE and second information is stored to a non-volatile memory of the UE. The first information may be a unique value and may include additional information. A connection request based at least in part on the first information is received. A connection response based at least in part on the second information and the connection request is sent. The embodiments further provide for non-transitory storage media and devices, such as UEs, for accomplishing the preceding method.

The embodiments yet further provide for a method implemented in a user equipment (UE). First information from a removable memory connected to the UE is loaded. The first information may be a unique value and may include additional information. The first information may have been stored to the removable memory by a second UE. A connection request based at least in part on the first information is sent. A connection response based at least in part on the connection request. The embodiments further provide for non-transitory storage media and devices, such as UEs, for accomplishing the preceding method.

In both of the preceding methods, the first information and the second information may be one or both of connection type data and connection parameter data. Connection type data may indicate at least one type of connection to be used for receiving the connection request. Connection parameter data may indicate at least one parameter for the type of connection to be used for receiving the connection request.

As used herein, the terms "shut off," "switch off," "power off," or "power down" may be used synonymously. However, the term "power down" may refer to various different states, from a device receiving no power to the device receiving sufficient power to enable less than all features available on the device. Likewise, the terms "turn on," "switch on," "power on," or "power up" may be used synonymously. However, the term "power on" may refer to different states, from a device receiving full power (relative to the devices' operating parameters) to the device receiving sufficient power to enable less than all features available on the device, yet more power relative to a "power down" state.

The embodiments contemplate one or more computer readable media. The term "computer readable medium" refers to a tangible storage device which can store data and from which a processor or other electronic device may read data. The term "non-transitory storage medium" also refers to such a tangible storage device.

In one embodiment, a user equipment (UE) is provided that includes a storage device, a removable memory, and a processor. The processor is configured, responsive to receiving a command to perform a swap operation, to store a unique value in the storage device and the removable memory, such that when the removable memory is transferred to a second UE in communication with the UE, the UE uses the unique value in transferring data between the UE and the second UE. A method and computer readable medium are also provide for implementing this embodiment.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method performed at a user equipment, the method comprising:
   responsive to detecting a command to perform a swap operation, writing a unique value to a storage device of the user equipment and writing the unique value to a removable memory connected to the user equipment;
   powering off the user equipment;
   after powering on the user equipment and determining that the removable memory has been removed from the user equipment:
      receiving a request from a requester, the request comprising a value, the value being obtained by the requester from the removable memory after the removable memory was removed from the user equipment;
      after receiving the request:
         determining if the value comprised in the request matches the unique value; and
         when there is a match, transferring user data stored at the user equipment to the requester.

2. The method of claim 1, further comprising, after receiving the request:
   determining a round-trip time of a data packet between the user equipment and the requester, and transferring the user data stored at the user equipment to the requester when there is a match between the value comprised in the request and the unique value and the round-trip time is within a predetermined threshold.

3. The method of claim 1, further comprising, after receiving the request:
   determining a physical distance between the user equipment and the requester, and transferring the user data stored at the user equipment to the requester when there is a match between the value comprised in the request and the unique value and the physical distance is within a predetermined threshold.

4. The method of claim 3, wherein the unique value comprises location data for the user equipment.

5. The method of claim 1, further comprising encrypting the user data prior to transferring the user data stored at the user equipment to the requester.

6. The method of claim 1, wherein the requester obtains the value of the request from the removable memory, the removable memory being connected to the requester after the removable memory was removed from the user equipment.

7. The method of claim 6, further comprising listening for a connection request from the requester after powering on the user equipment and determining that the removable memory has been removed from the user equipment.

8. The method of claim 1, wherein both the user equipment and the requester comprise a mobile wireless communications device.

9. The method of claim 1, wherein the user data comprises at least one of contact information, settings and preferences.

10. A user equipment, comprising:
   a storage device;
   a removable memory connector;
   at least one processor in communication with the storage device and the removable memory connector, the at least one processor being configured to:
      in response to detecting a command to perform a swap operation, write a unique value to the storage device and write the unique value to a removable memory connected to the user equipment via the removable memory connector;
      power off the user equipment;
      after powering on the user equipment and determining that the removable memory has been removed from the removable memory connector:
         receive a request from a requester, the request comprising a value;
         after receiving the request:
            determine if the value comprised in the request matches the unique value; and
            when there is a match, transfer user data stored at the user equipment to the requester.

11. The user equipment of claim 10, wherein the at least one processor is further configured to, after receiving the request:
   determine a round-trip time of a data packet between the user equipment and the requester, and transferring the user data stored at the user equipment to the requester when there is a match between the value comprised in the request and the unique value and the round-trip time is within a predetermined threshold; or
   determine a physical distance between the user equipment and the requester, and transferring the user data stored at the user equipment to the requester when there is a match between the value comprised in the request and the unique value and the physical distance is within a predetermined threshold.

12. The user equipment of claim 11, wherein the unique value comprises location data for the user equipment.

13. The user equipment of claim 10, wherein the at least one processor is further configured to encrypt the user data prior to transferring the user data stored at the user equipment to the requester.

14. The user equipment of claim 10, wherein the at least one processor is further configured to listen for a connection request from the requester after powering on the user equipment and determining that the removable memory has been removed from the user equipment.

15. The user equipment of claim 14, wherein the at least one processor is configured to write the unique value to the storage device and to the removable memory prior to powering off the user equipment.

16. The user equipment of claim 10, wherein the user equipment comprises a mobile wireless communications device.

17. The user equipment of claim 10, wherein the user data stored at the user equipment is stored in the storage device.

18. A method performed at a receiving user equipment, the method comprising:
   detecting that a removable memory is connected to the receiving user equipment, the removable memory storing information comprising a unique value written to the removable memory by a sending user equipment while the removable memory was connected to the sending user equipment, the unique value being written by the sending user equipment to the removable memory in response to a detected command to perform a swap operation and prior to removal of the removable memory from the sending user equipment;
   after detecting that the removable memory is connected to the receiving user equipment, transmitting a request to the sending user equipment, the request comprising at least the unique value;
   establishing a data transfer connection with the sending user equipment when the request is received after the sending user equipment is powered on and the sending user equipment detects that the removable memory has been removed from the sending user equipment;
   receiving, over the data transfer connection, user data from the sending user equipment.

19. The method of claim 18, wherein the information further comprises at least one of connection type data and connection parameter data, and the request comprises the at least one of connection type data and connection parameter data.

20. The method of claim 18, further comprising executing a swap application stored on the removable memory to install the user data received from the sending user equipment.

* * * * *